Oct. 13, 1970        H. J. GERBER        3,533,298
LEAD SCREW AND NUT MECHANISM
Filed Aug. 28, 1968
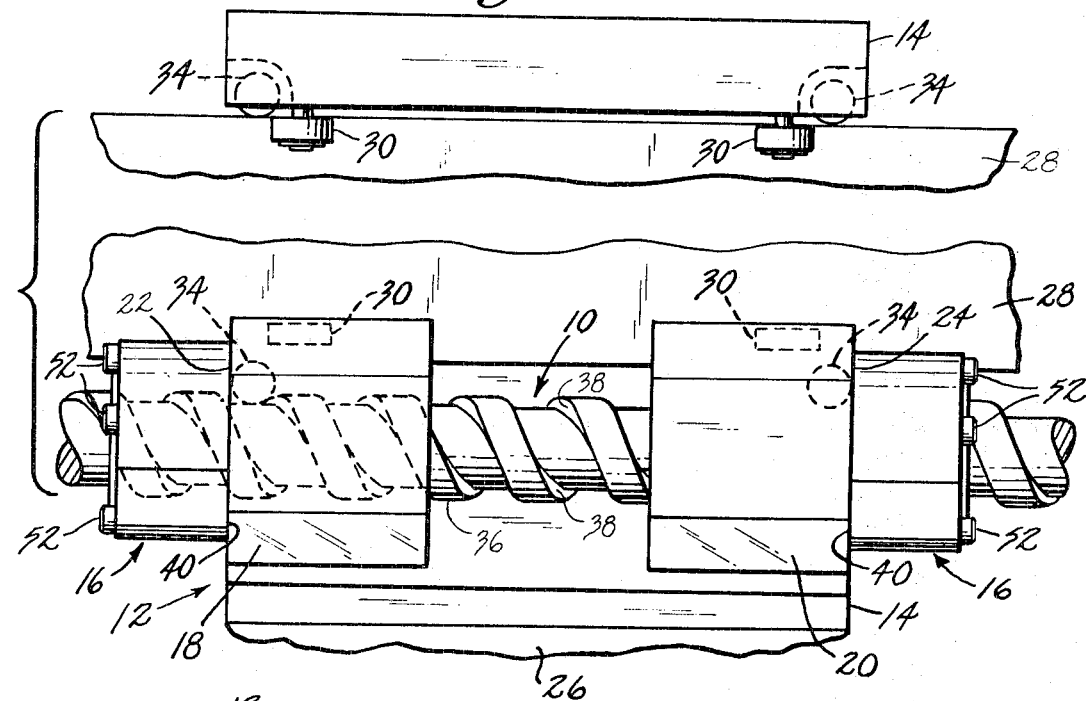
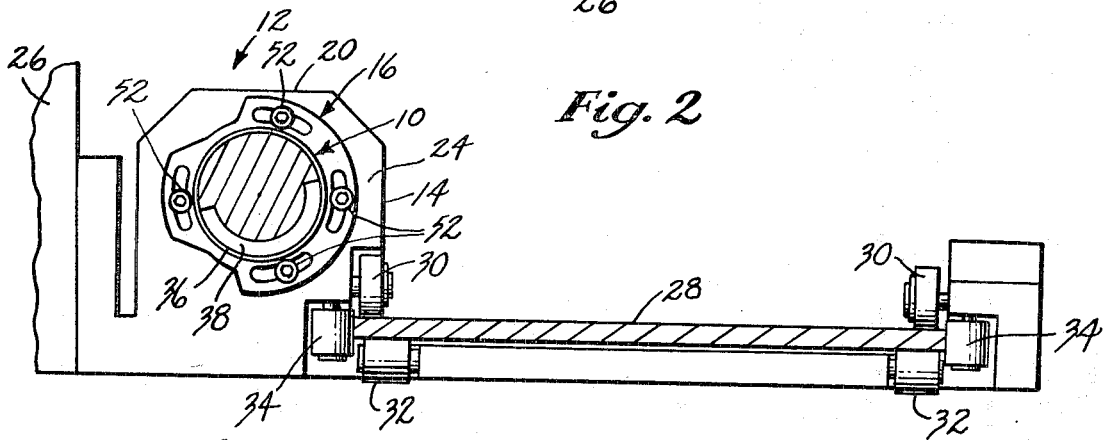
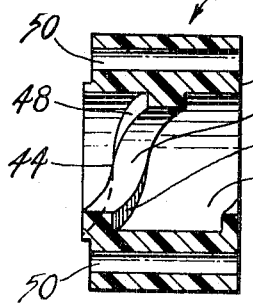
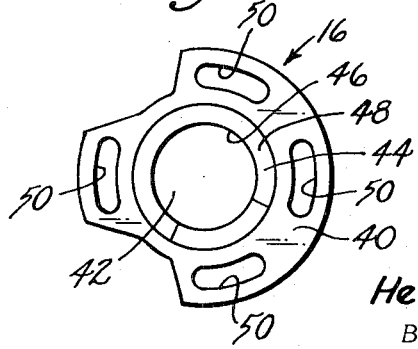
INVENTOR.
Heinz Joseph Gerber
BY
McCormick, Paulding & Huber
ATTORNEYS

United States Patent Office 3,533,298
Patented Oct. 13, 1970

3,533,298
LEAD SCREW AND NUT MECHANISM
Heinz Joseph Gerber, West Hartford, Conn., assignor to The Gerber Scientific Instrument Company, South Windsor, Conn., a corporation of Connecticut
Filed Aug. 28, 1968, Ser. No. 755,858
Int. Cl. F16h 25/12
U.S. Cl. 74—89.15     5 Claims

ABSTRACT OF THE DISCLOSURE

A motion transmitting mechanism having an axially elongated helically threaded lead screw and a nut assembly supported for axial movement along the screw. The nut assembly includes a pair of axially spaced plastic nuts carried by a frame and threadably engaging the screw to move the frame relative to the screw when the screw is rotated in either direction relative to the frame. The nuts are angularly adjustable relative to each other to adjust axial play in the mechanism and relative to the frame to adjust the axial position of the nut assembly relative to the screw for a given angular position of the screw. Fasteners secure the nuts in selected angular position relative to the frame to retain the mechanism in adjustment.

BACKGROUND OF THE INVENTION

This invention relates in general to an improved lead screw and nut mechanism and deals more particularly with such a mechanism for achieving accurate high speed translatory motion transmission and part positioning.

The apparatus of the present invention is particularly well adapted for use in moving the carriages of an X-Y plotter of the type generally described in U.S. Pat. No. 3,293,651 to Gerber et al., entitled X-Y plotter, issued Dec. 20, 1966, and assigned to the same assignee as this application. The invention is, however, applicable to other uses and should prove particularly well suited for use on machine tools, scientific instruments and the like.

In order to achieve accuracy in high speed operation, a plotter of the aforedescribed general type usually employs a precision motion transmission apparatus such as a lead screw mechanism of the recirculating ball type. Such mechanisms are very costly because of the high precision machining necessary to hold the parts within the narrow tolerance limits required.

The general aim of the invention is to provide an improved lead screw and nut mechanism for accurate high speed motion transmission and part positioning which is adjustable to minimize axial play or backlash and which may be manufactured more economically than existing ones of comparable speed and accuracy.

SUMMARY OF THE INVENTION

The present invention resides in a mechanism comprising a lead screw, a frame or housing for movement axially of the screw and two drive members carried by the frame. The drive members threadably engage the screw at axially spaced points therealong and are angularly adjustable relative to the frame about the axis of the screw to control backlash and the axial position of the housing relative to the screw for a given angular position of the screw.

BRIEF DESCRIPTION OF THE DRAWING

FIG. 1 is a plan view of a lead screw and nut mechanism embodying the invention.
FIG. 2 is an end view of the mechanism of FIG. 1.
FIG. 3 is a longitudinal sectional view through a nut of the embodiment of FIG. 1.
FIG. 4 is an end view of the nut of FIG. 3.

DETAILED DESCRIPTION OF PREFERRED EMBODIMENT

Generally, the mechanism of the present invention comprises an axially elongated screw rotatably supported at both ends and a nut assembly received on the screw for axial movement therealong. Adjustable coupling between the screw and the nut assembly is accomplished by a pair of drive members of nuts carried by a nut frame and engaging the thread on the screw so that rotation of the screw in either direction relative to the frame causes axial movement of the frame. At least one of the thread engaging drive members is adjustable relative to the frame and to the other drive member to eliminate or vary the amount of backlash or axial play existing between the frame and the screw. Preferably, both of the drive members are adjustable relative to the frame to allow adjustment of the axial position of the frame relative to the screw for a given angular position of the screw.

Referring now to the drawing and particularly to FIGS. 1 and 2, an apparatus embodying the invention, and adapted for use on the X-Y plotter of the previously mentioned U.S. patent, is shown to comprise a lead screw and a nut assembly generally indicated at 10 and 12, respectively. The nut assembly includes a generally L-shaped frame 14 and a pair of drive members or nuts indicated generally at 16, 16 carried by the frame and drivingly engaged with the screw. To accommodate the nuts the frame 14 includes two substantially identical bearing portions 18 and 20 of opposite hand axially spaced from one another along the screw. Each of the bearing portions 18 and 20 has a cylindrical bore extending therethrough for receiving the screw 10 and includes a radially disposed bearing surface at its outer end, the bearing surfaces of the portions 18 and 20 being indicated at 22 and 24, respectively.

A load or driven apparatus is attached to the frame 14 and partially shown at 26 in FIG. 2, and may, for example, comprise the print head of the plotter. The plotter, which is not shown, also includes means supporting the screw 10 for rotation about its longitudinal axis and has a generally rectangular guide plate or way 28 arranged parallel to the screw 10 and fixed relative to the longitudinal axis thereof. A suitable drive means is also provided for rotating the screw about its longitudinal axis.

The nut frame carries rollers which engage the way 28 to prevent rotation of the frame about the axis of the screw as the screw is rotated. In the illustrated embodiment, a sufficient number of way engaging rollers are provided to restrain the nut frame to rectilinear motion along the length of the way and the way is actually relied upon as the main support for the nut assembly. This arrangement need not, however, always be followed and in other applications the screw may provide the main support for the nut with an accompanying way or other similar means serving only primarily to prevent rotation of the nut frame.

Further considering the illustrated way engaging rollers, four substantially identical groups of three such rollers are provided with the three rollers of each group spaced from the other groups and arranged to respectively engage three different surfaces of the way 28. In FIG. 2, two such groups of rollers are shown. Each group includes a top roller 30, a bottom roller 32 and a side roller 34. The top and bottom rolls 30, 30 and 32, 32 are supported for rotation about horizontal axes and respectively engage and roll along the top and bottom surfaces of the way 28. The side rollers 34, 34 rotate about vertical axes and engage and roll along the vertical side surfaces of the way. The two groups of rollers shown in FIG. 2 are located near the right-hand corners of the frame 14 as it appears in FIG. 1, the other two groups being located near the left-hand frame corners. It should be noted that a portion of the frame passes beneath the way 28 to receive the two groups of rollers on the side of the way remote from the screw. Thus, it will be obvious from FIGS. 1 and 2 that the nut assembly 12, which carries the print head or other lead 26, is supported for translational or rectilinear movement on the way 28. The way supports the weight of the nut assembly and the load, so that no appreciable amount of weight bears upon the screw 10, and also serves to prevent rotation of the nut assembly with the screw.

The lead screw 10 is preferably made from metal and includes a single helical thread defined at least in part by a pair of shoulders. Although the exact shape of the thread may vary somewhat without departing from the invention, preferably the thread has a rectangular cross section and includes an outer land 36 generated by a line parallel to the axis of the screw and two shoulders 38, 38 each generated by simultaneous rotation and axial movement of a line normal to the screw axis. The land 36 is relatively wide, the screw 10 being of such axial length and pitch as to provide a substantial axial gap or groove between two adjacent thread convolutions.

The drive members or nuts may be made from various materials and may vary widely in their construction and in the manner of attachment to the nut frame. In the illustrated embodiment the nuts 16, 16 are made from a plastic material. Delrin has proven particularly suitable for this purpose, because of its durability and inherent and relatively low coefficient of friction in coupled engagement with a metallic screw. Referring to FIGS. 3 and 4, each nut 16 has a generally cylindrical body and includes a radially disposed, bearing surface 40 for engaging an associated one of the bearing surfaces 22 and 24 on the frame. Portions of the nut body are relieved or cut away to avoid interference with parts of the plotter (not shown). An axial bore 42 extends through the nut 16 and includes a single internal helical thread 44 for engaging the thread on the screw 12. The thread 44 has a generally rectangular cross section and includes a land 46 and a pair of shoulders 48, 48 generated as previously described with reference to the lands and shoulders on the screw 10, but spaced apart by a distance somewhat less than the spacing between adjacent screw shoulders 38, 38. A plurality of circumaxially elongated slots 50, 50 extend axially through the nut body, each slot receiving an associated threaded fastener 52 which threadably engages the nut frame 14 for securing the nut 16 thereto.

One nut 16 is angularly adjusted relative to the other nut and to the frame to bring a shoulder 48 on each of the nuts into engagement with an associated shoulder 38 on the screw to minimize backlash or axial play between the nut assembly and the screw. To make this adjustment the fasteners 52, 52 associated with either nut 16 are loosened and the nut is rotated until the backlash is reduced to the desired value. Thereafter, the fasteners 52, 52 are retightened to secure the nut in the selected angular position. To adjust the axial position of the nut assembly 12 relative to the screw for a given angular position of the screw both nuts 16, 16 are loosened and simultaneously rotated in the same direction relative to the frame.

The drawing shows a preferred embodiment of the invention and such embodiment has been described, but it will be understood that various changes may be made from the construction disclosed, and that the drawing and description are not to be construed as defining or limiting the scope of the invention.

What is claimed is:

1. In a lead screw and nut mechanism the combination comprising an axially elongated lead screw having a helical thread including a pair of spaced apart shoulders, a nut frame arranged for axial movement along said screw and having a pair of axially spaced apart radially disposed bearing surfaces, a pair of axially spaced nuts carried by said nut frame, each of said nuts having a radially disposed bearing surface engaging an associated one of said bearing surfaces on said nut frame, each of said nuts having a bore therethrough receiving an associated portion of said screw therein and including an internal helical thread having a shoulder for engaging an associated one of said shoulders on said screw for axially moving said nut frame relative to said screw when said screw is rotated in either direction relative to said frame, at least one of said nuts being angularly adjustable about the axis of said screw and relative to said frame and the other of said nuts for moving said shoulder on said one nut axially toward and away from an associated one of said shoulders on said screw to adjust axial play between said nut frame and said screw means for securing said other nut in fixed position relative to said frame, and means for releasably securing said one nut in selected angular position relative to said frame.

2. The combination defined in claim 1 wherein said helical thread and said internal thread each has a generally rectangular cross section including a generally flat axially extending land.

3. The combination defined in claim 1 wherein said one nut has a circumaxially elongated slot extending axially therethrough and said means for releasably securing said one nut comprises a fastener extending through said slot and engaging said frame.

4. The combination defined in claim 1 wherein each of said nuts is made from plastic material.

5. The combination defined in claim 4 wherein said material is Delrin.

References Cited

UNITED STATES PATENTS

| 1,249,299 | 12/1917 | Barker | 74—424.8 |
| 2,894,408 | 7/1959 | Verhoeff | 74—424.8 |
| 3,094,001 | 6/1963 | Bradley | 74—424.8 |
| 3,133,453 | 5/1964 | LaPointe | 74—424.8 |
| 3,277,736 | 10/1966 | Goodman | 74—424.8 |
| 3,331,257 | 7/1967 | Gerber | 74—424.8 |

WESLEY, S. RATLIFF, JR., Primary Examiner

U.S. Cl. X.R.

74—424.8